(12) United States Patent
Kroger et al.

(10) Patent No.: US 8,590,908 B2
(45) Date of Patent: Nov. 26, 2013

(54) FRONT AXLE SUPPORT HAVING AN INTEGRATED STEERING GEAR HOUSING

(75) Inventors: Matthias Kroger, Hille (DE); Ulf Sudowe, Georgsmarienhutte (DE); Michael Scholten, Blons (AT); Zoltan Stamm, Grabs (ES); Udo Wachter, Wallenhorst (DE)

(73) Assignees: GMF Umformtechnik GmbH, Bielefeld (DE); ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 13/394,659

(22) PCT Filed: Aug. 6, 2010

(86) PCT No.: PCT/EP2010/061511
§ 371 (c)(1),
(2), (4) Date: May 23, 2012

(87) PCT Pub. No.: WO2011/029677
PCT Pub. Date: Mar. 17, 2011

(65) Prior Publication Data
US 2012/0235397 A1   Sep. 20, 2012

(30) Foreign Application Priority Data
Sep. 10, 2009   (DE) .......................... 10 2009 040 821

(51) Int. Cl.
*B62D 21/12* (2006.01)

(52) U.S. Cl.
USPC ................. 280/93.515; 280/785; 280/124.109

(58) Field of Classification Search
USPC ................. 280/785, 124.109, 93.513, 93.514, 280/93.515, 796; 296/193.09; 180/312
See application file for complete search history.

(56) References Cited

U.S. PATENT DOCUMENTS

| 5,879,026 | A * | 3/1999 | Dostert et al. | 280/781 |
|---|---|---|---|---|
| 5,997,038 | A * | 12/1999 | Dostert et al. | 280/781 |
| 6,102,416 | A * | 8/2000 | Harkrader et al. | 280/93.515 |
| 6,783,157 | B2 * | 8/2004 | Huang et al. | 280/785 |
| 7,210,368 | B2 * | 5/2007 | Odenthal et al. | 74/422 |
| 7,258,354 | B2 * | 8/2007 | Kim et al. | 280/124.109 |
| 8,226,097 | B2 * | 7/2012 | Kudla et al. | 280/93.515 |
| 2003/0107200 | A1 | 6/2003 | Huang et al. | |
| 2004/0232642 | A1 * | 11/2004 | Bowling et al. | 280/93.515 |
| 2008/0092683 | A1 * | 4/2008 | Spetz et al. | 74/388 PS |
| 2009/0095559 | A1 * | 4/2009 | Mitake | 180/312 |

FOREIGN PATENT DOCUMENTS

| DE | 102005062330 A1 | 6/2007 |
|---|---|---|
| EP | 0794106 A2 | 9/1997 |
| EP | 0764571 B1 | 1/2001 |

* cited by examiner

Primary Examiner — Drew Brown
(74) Attorney, Agent, or Firm — The Webb Law Firm (57) ABSTRACT

Disclosed is a front axle support for a motor vehicle having support members, which comprise holders for mounting wheel guidance members, and a transverse structure, which forms a housing of a steering gear, wherein the support members are connected to the transverse structure by weld joints. In a first teaching, the front axle support according to the invention is characterized in that the support members are in the form of longitudinal supports, a portion of each longitudinal support being formed from sheet metal shells welded together, and in that the transverse structure is in the form of a transverse support and is formed from a steering gear housing made of steel.

16 Claims, 7 Drawing Sheets

Fig.7 though of a motor vehicle having support members, which comprise holders for mounting wheel guidance members, and a transverse structure, which forms a housing of a steering gear, the support members being connected to the transverse structure. In a first teaching, the front axle support according to the invention is characterised in that the support members are in the form of longitudinal supports, a portion of each longitudinal support being formed from sheet metal shells welded together, and in that the transverse structure is in the form of a transverse support and is formed from a steering gear housing made of steel.

FRONT AXLE SUPPORT HAVING AN INTEGRATED STEERING GEAR HOUSING

BACKGROUND OF THE INVENTION

1. Field of the Invention

The invention relates to a front axle support for a motor vehicle having support members, which comprise holders for mounting wheel guidance members, and a transverse structure, which forms a housing of a steering gear, the support members being connected to the transverse structure.

2. Description of Related Art

The purpose of front axle supports is to receive the suspension arms, which guide the wheels, via corresponding bearings, and to bear the forces acting on the wheel or transmit them into the body. Modern steering gears, placed underneath, are generally screwed to the front axle support, which conventionally consists of two longitudinal supports and a transverse support which connects the longitudinal supports. The steering gear housing of modern front axle support systems conventionally consists of cast aluminium, since it is sufficiently strong whilst also being light. Weight reduction in automobile construction is one of the most important measures for lowering the fuel consumption levels and reducing the $CO_2$ emission.

EP 0 764 571 B1 discloses a front axle support which is formed from a steering gear housing and longitudinal supports (lateral supports) which are screwed thereto. Shoulders extending in the transverse direction of the vehicle are formed on the longitudinal supports, vertically upwardly extending fittings being provided for receiving fixing screws so as to connect the shoulders to the steering gear housing. The longitudinal supports disclosed in EP 0 764 571 B1 are relatively complex cast parts having integrally cast longitudinal and transverse ribs.

EP 0 794 106 B2 discloses a three-part front axle support having a transverse support which forms a housing of a rack and pinion steering gear, the housing being tubular and forming the central part of the transverse support. A longitudinal support (support part) is rigidly connected to each of the ends of the tubular housing, and comprises bearings for linking the wheel guidance members and recesses for means for fixing the front axle support to the vehicle body. The tubular housing consists of light metal and may be prefabricated as an extruded part. The longitudinal supports also consist of light metal, and what is known as semi-solid metal casting is proposed for manufacturing them. The tubular light metal housing acts as a transverse support, connecting the longitudinal supports consisting of light metal, and is connected thereto by welding at mutually matching connection pieces, which are formed as welding sockets.

Producing the steering gear housing and the longitudinal support from light metal, in particular cast aluminium, is advantageous for weight reduction or for lowering the fuel consumption of the vehicle equipped in this manner. On the other hand, the use of light metal entails relatively high material and production costs.

The object of the present invention is to provide a front axle support for a vehicle which offers a gain in construction space in the region of the front axis whilst also reducing the weight and cost of the structural components and steering gear components.

SUMMARY OF THE INVENTION

The front axle support according to the invention comprises support members, which comprise holders for mount- Thus, in the front axle support according to the invention, the transverse support of a conventional front axle support having a screwed-on steering gear housing made of cast aluminium is replaced by a steering gear housing preferably made of steel. It is also conceivable to use a light metal sheet, for example of aluminium or magnesium, as a sheet metal blank, or to use other adapted materials as appropriate. The weight balance is good despite the preferred use of steel, since the steel steering gear housing is considerably lighter than the conventional transverse support which it replaces, the cast aluminium steering gear housing and the connecting members thereof all put together. The front axle support according to the invention having an integrated steering gear thus makes a significant contribution to weight reduction.

Savings on component and manufacturing costs can also be made with the front axle support according to the invention. The change of the material of the steering gear housing, from cast aluminium to preferably steel, and the reduced use of material for the structural components of the front axle support make a significant contribution to this. In addition, omitting the screwing points associated with the steering gear housing simplifies the structural components and reduces the number of standard parts. In the front axle support according to claim 2, in particular the use of curved steel tube portions to produce the longitudinal supports of the front axle support is advantageous. The production of the front axle support is thus simplified with respect to the welding, and this also has a favourable effect on the manufacturing costs. Logistical and assembly costs are reduced for the automobile manufacturer, since the steering gear housing with the steering gear components comprised therein no longer has to be transported and assembled separately.

In particular in vehicles with front-wheel drive or four-wheel drive, the situation regarding construction space in the region of the front axle is difficult. In particular for new, energy-saving technologies, such as hybrid drives and developments of power-assisted steering systems, or when using additional units such as active stabilisers, any gain in construction space is valuable. In the front axle support according to the invention, the steering gear housing replaces or is geometrically superposed on the conventional transverse support, and a considerable gain in construction space is thus achieved.

In principle, the steering gear integrated into the front axle support according to the invention may be in the form of a hydraulic steering gear. However, a preferred configuration of the front axle support according to the invention provides the integration of an electromechanical steering gear having a sensor unit for measuring the steering torque. In this case, the steering torque is measured on the basis, for example, of a contactless measurement of the twist angle of a torsion rod. With an electrically-assisted steering gear of this type, it is possible to adapt the assisting force to the vehicle speed and/or to further influencing factors. An electromechanical steering gear of this type further makes it possible to provide additional functions, such as side wind compensation or lane departure warning assistance. The energy consumption is also reduced by comparison with a hydraulic steering gear, since the electromechanical steering gear is only supplied with energy when it is in use. In particular, with an electromechanical steering gear, the hydraulic fluid required for a hydraulic steering gear, and the hydraulic pump and lines can be dispensed with, again resulting in a reduced environmental impact and an additional gain in construction space in the vehicle. The idea behind the invention thus has the advantage that a higher-quality steering function can be integrated, without the construction space or the position of adjacent units having to be changed for this purpose.

To provide an electromechanical steering gear, in a preferred configuration the steering gear housing of the front axle support according to the invention encloses the steering gear components and receives the bearing members. The steering gear housing is preferably in the form of a single-piece welded construction of sheet metal components. For example, the steering gear housing can be divided into different portions having correspondingly arranged steering gear components, specifically into a tubular gear rack housing, a bearing housing which receives a ball screw, and a ball screw housing which encloses a belt drive. In this case, the gear rack housing and the bearing housing are preferably welded to a motor plate arranged between them for mounting a servo steering motor. The motor plate arranged in this manner has the advantage that the drive unit comprising the servo steering motor can be placed in various positions in accordance with the respective construction space conditions. The servo steering motor in this case is preferably arranged in such a way that the motor shaft thereof extends parallel to the longitudinal axis of the steering gear housing.

To achieve sufficient flexural rigidity of the steering gear housing with the lowest possible weight, it is further advantageous if, in a further configuration of the front axle support according to the invention, the motor plate is connected to the gear rack housing via a supporting metal sheet. The supporting metal sheet reduces the jump in rigidity between the motor plate and the gear rack housing, thus helping to even out the distribution of stresses when the front axle support is loaded.

For reliable operation of the steering gear, it is important that the moving parts inside the steering gear housing are protected from dirt and water. On the other hand, the construction of the integrated steering housing of the front support axle should also be as simple as possible to assemble. These requirements are reliably met if, in a further preferred configuration of the invention, the ball screw housing comprises a flange, which defines a lateral mounting opening and is provided with recesses and nuts welded thereto for fixing a cover lid which seals the ball screw housing.

The cover lid (housing lid) can be manufactured relatively cost-effectively, for example from sheet steel, by forming and cutting to size. The cover lid of the front axle support according to the invention preferably comprises an opening or through hole having a collar-shaped formation as a seal seat for a bellows enclosing a track rod. This makes it possible for the cover lid to receive substantially no steering forces.

The bearing housing (main bearing housing) which receives the ball screw has a complex shaping and shearing geometry and thus has to meet high requirements as regards to measurement precision. In this respect, it is advantageous if, in a further configuration of the front axle support according to the invention, the bearing housing is formed with an internal diameter which widens in steps and with an axially extending cutout. The seat of the ball screw in the bearing housing is additionally machined to provide high dimensional accuracy and roundness. By forming the bearing housing preferably as an impact extruded part, the costs of the subsequent machining or material removal can be kept low.

A further preferred configuration of the front axle support according to the invention consists of nuts being welded or threaded holes being formed on the portions, preferably formed from sheet steel shells, of the longitudinal supports, a reinforcing and/or shielding metal sheet being screwed to said nuts or threaded holes. The reinforcing and/or shielding metal sheet which strengthens the front axle support may for example be made of aluminium.

In a second teaching, the front axle support according to the invention is characterised in that the support member is formed from sheet metal shells welded together and the transverse structure is formed from a central portion of the sheet metal shells welded together and a steering gear housing made of steel.

BRIEF DESCRIPTION OF THE DRAWINGS

In the following, the invention is described in greater detail by way of drawings showing a plurality of embodiments. In the drawings:

FIG. 5 shows a portion of the front axle support of FIG. 3, comprising a mounted steering rack and a housing lid which is to be screwed on;

DESCRIPTION OF THE PREFERRED EMBODIMENTS

Figure 1:
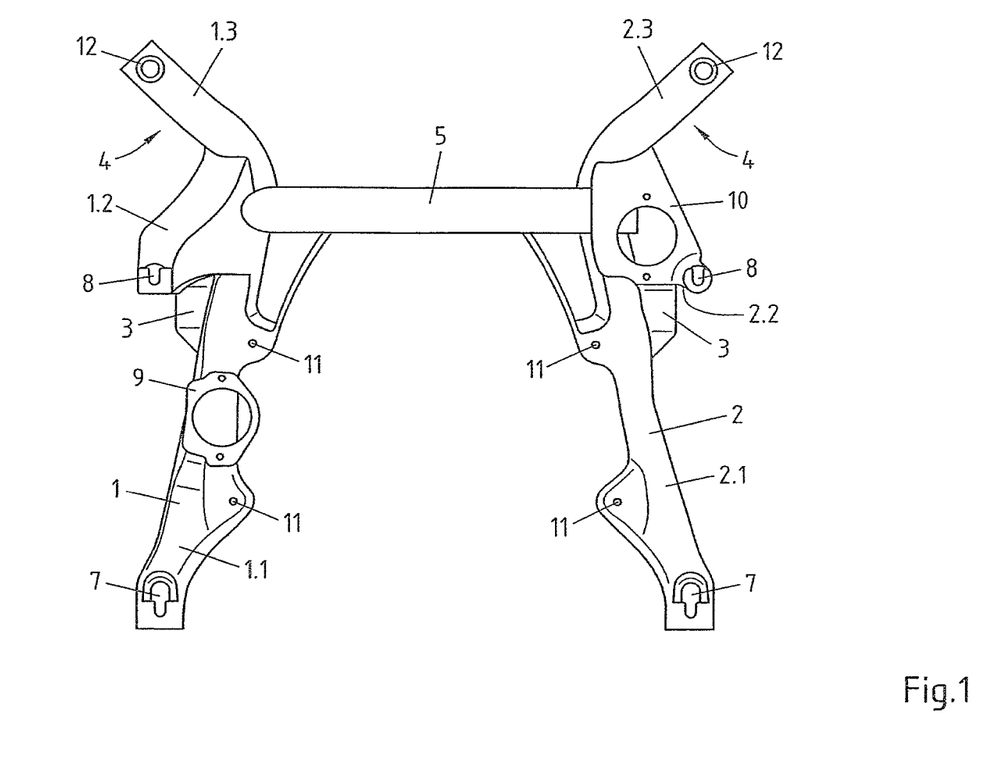
FIG. 1 is a basic diagram of a first front axle support according to the invention.

FIG. 1 shows an exemplary configuration of a first front axle support according to the invention having an integrated steering gear housing. The front axle support consists of longitudinal supports 1, 2, which comprise holders 3, 4 for mounting wheel guidance members. The longitudinal supports 1, 2 are connected by weld joints to a steering gear housing 5, which also takes on the role of a transverse support. The rear portions of the longitudinal supports 1, 2 are formed from sheet steel shells 1.1, 1.2, 2.1, 2.2 welded together. Said supports comprise recesses 7, 8 for fixing or screwing the front axle support to the vehicle body. In the contact surfaces thereof, the rear and central recesses 7, 8 comprise notches, which cause these connections to fail in a defined manner in the event of a crash. The sheet steel shaped parts 1.2, 2.2 comprising the central recesses 8 or connecting points are applied to the longitudinal supports 1, 2 and welded thereto. Further, brackets or holders 9, 10 for mounting an internal combustion engine are attached and welded to the longitudinal supports 1, 2. Further, fixing portions comprising apertures 11 for screwing on an aluminium reinforcement sheet (shear panel) are formed on the sheet steel shells 1.1, 2.1, produced by shaping and cutting, of the longitudinal supports 1, 2 (see reference numeral 13 in FIG. 2).

In the front region, the longitudinal supports 1, 2 are formed by curved steel tube portions 1.3, 2.3. A mounting bush 12 is arranged at the end region of each steel tube portion 1.3 or 2.3, and is inserted into a recess of the tube portion 1.3, 2.3 in a positive fit and welded to the tube portion.

The transverse connection of the left and right longitudinal supports 1, 2 is formed by the steering gear housing 5 made of steel. The tubular steering gear housing 5 may be a hydraulic steering gear. Integrating a steering gear housing of this type, frees up the space of a conventional transverse support having no steering function. This free space, in front of and above the front axle support, can be used for developments to the front axle.

Figure 2:
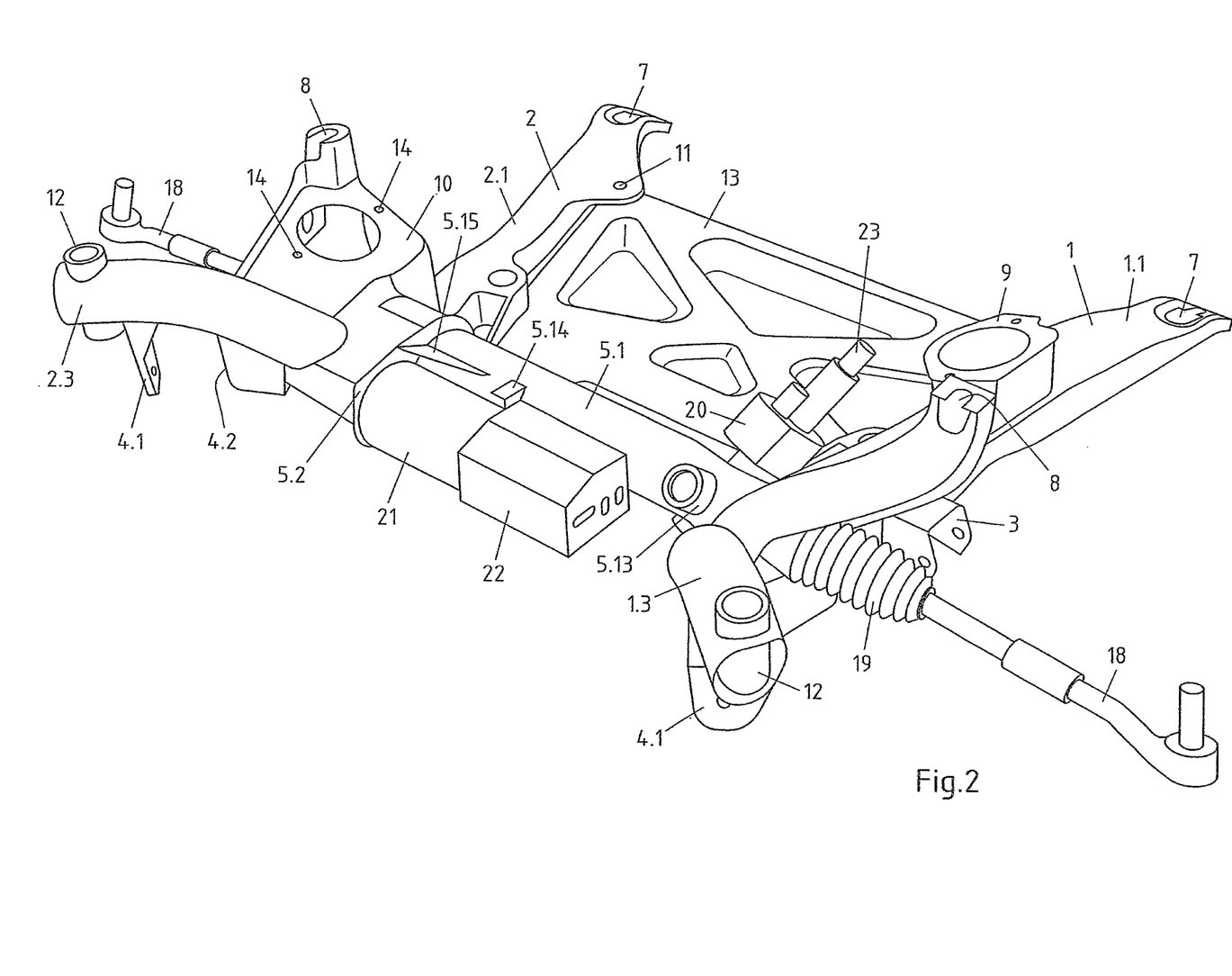
FIG. 2 is a perspective drawing of a front axle support according to the invention, comprising a servomotor, track rods and a reinforcing metal sheet.

According to the invention, part of this free space may be used for the integration of an electromechanical steering gear, as is shown in the embodiment of FIG. 2. In this case, additional units such as the hydraulic pump, the equalising tank and so forth can be dispensed with, in such a way that construction spaces are additionally gained in other regions of the vehicle. Thus, with the front axle support according to the invention, an electrically-assisted steering gear can be integrated into the available construction space of a mass-produced vehicle, without it being necessary to encroach on adjacent construction spaces.

The front axle support having an integrated steering gear shown in FIG. 2 forms a system or module which is composed of the actual structural component of shaped, welded sheet steel and the mounted steering gear components. The front axle support is formed in an open U shape and is reinforced by an aluminium reinforcing metal sheet 13 screwed thereto.

The longitudinal supports 1, 2 of the module are formed as two shells in the rear region. Upper and lower shells of the longitudinal supports 1, 2 are denoted as 1.11, 1.12, 2.11 and 2.12 in FIGS. 3 and 4. They comprise recesses 7 for fixing at the rear the front axle support to the vehicle body and clearances 11 having nuts welded thereon for fixing the reinforcing metal sheet 13.

Figure 3:
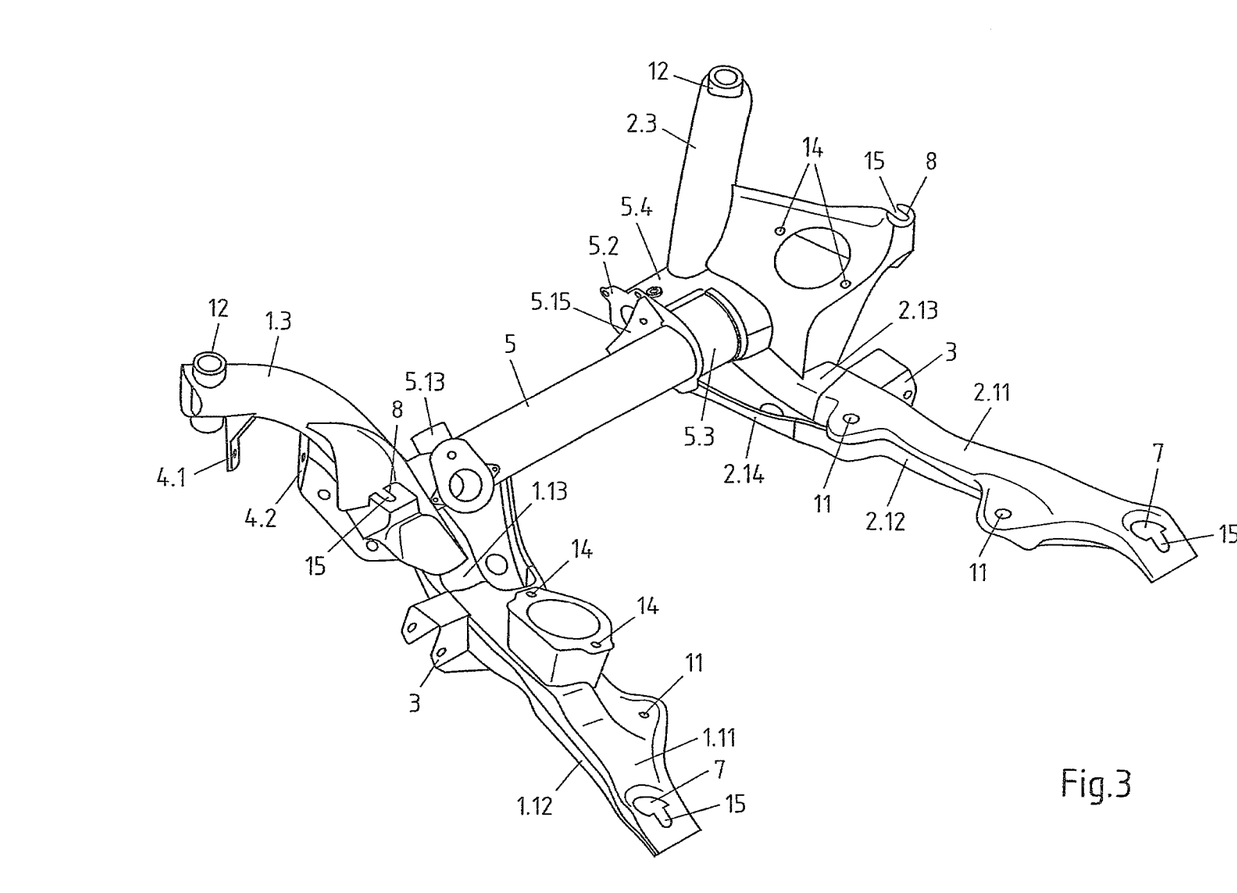
FIG. 3 is a perspective view of the front axle support of FIG. 2.
Figure 4:
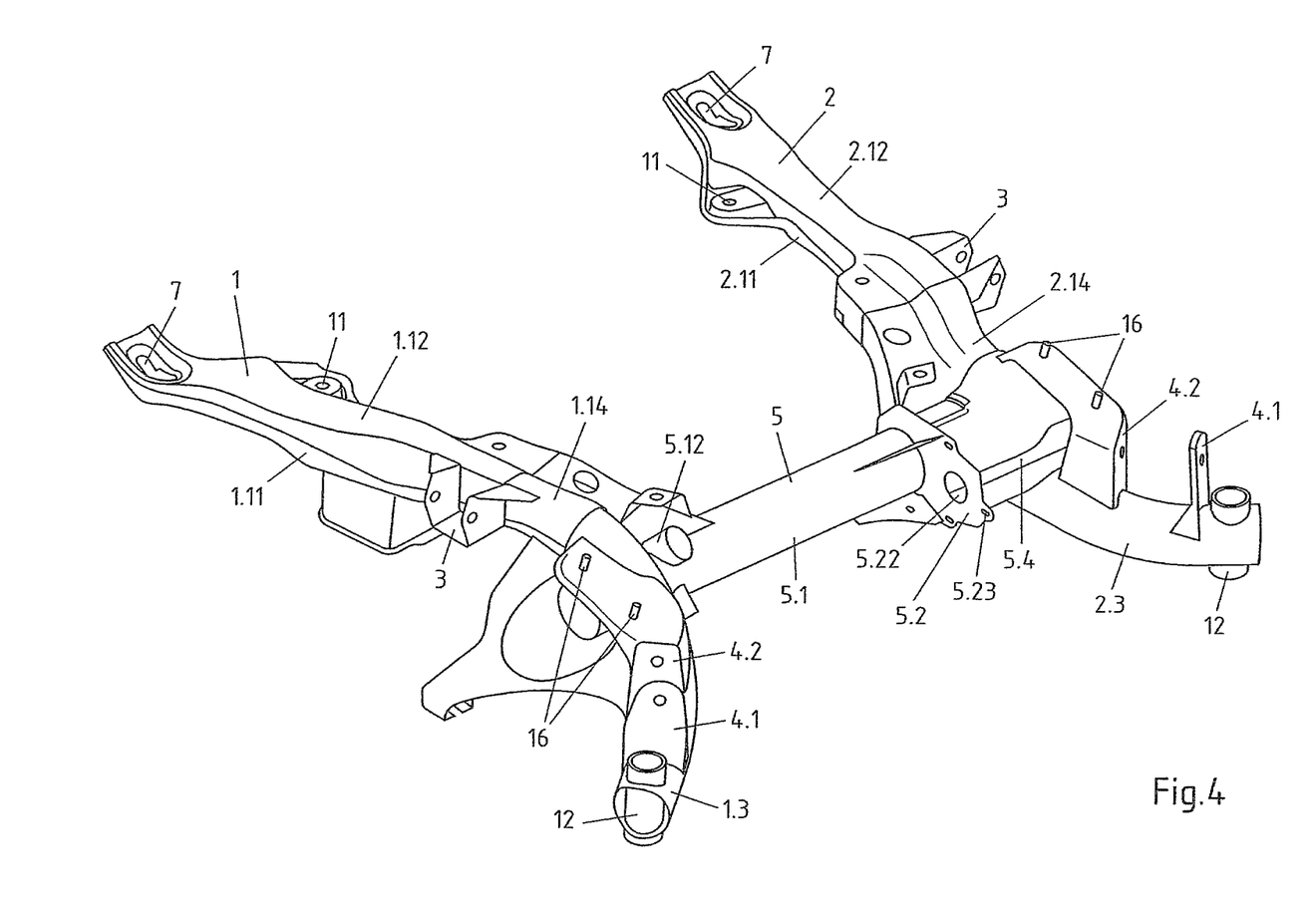
FIG. 4 is a perspective view from below of the front axle support of FIG. 2.

The form of the weld joint of the upper and lower shell varies from a butt weld on the outside to an overlapping or fillet weld on the inside of the longitudinal support shells 1.11, 1.12, 2.11, 2.12. This configuration avoids the unnecessary weight which might for example be involved in a conventional flange construction. The upper and lower shell of each longitudinal support 1, 2 has a plurality of parts in the longitudinal direction, i.e. is formed from a plurality of upper shell parts 1.11, 1.13, 2.11, 2.13 and lower shell parts 1.12, 1.14, 2.12, 2.14. In the front region, the longitudinal supports 1, 2 are in turn guided onwards through curved tube portions 1.3, 2.3, the ends of which are provided with extruded mounting bushes 12, at which the front axle support can be screwed to the body. In the region of the steering gear housing 5, the use of the tube portions 1.3, 2.3 prevents weld seam collisions, which would otherwise occur as a result of the large number of individual parts provided in this region.

Cup-shaped sheet steel shaped parts 9, 10, for receiving motor bearings and sheet steel shaped parts 1.2, 2.2 for screwing the central portion of the front axle support to the body are welded onto the longitudinal supports 1, 2. The motor bearings are each fixed by two weld nuts 14. The rear and central screwing portions of the longitudinal supports 1, 2 comprise notches 15 in the contact surfaces thereof, so as to cause these connection points to fail in a defined manner if a particular load is exceeded in the event of the vehicle impacting against an obstacle.

Single-piece fork-shaped holders 3 are welded onto the sides of the longitudinal supports 1, 2 in the region of the welded sheet steel shells 1.11, 1.12, 2.11, 2.12, and provide linkage of wheel guidance members (e.g. suspension arms). Further, the longitudinal supports 1, 2 are provided with two-part holders 4.1, 4.2, which provide linkage of trailing arms.

The holders 4.1, 4.2 are welded to the tubular portions 1.3, 2.3 of the longitudinal supports. The inner holders 4.2 also provide fixing of a stabiliser. For this purpose, threaded bolts 16 are pressed into the contact surfaces for the stabiliser bearings. The holders 3 or brackets 4.1, 4.2 which receive the adjacent axle components are connected exclusively in flexurally rigid regions of the front axle support, for example in the region of curves of the sheet steel shells 1.11, 2.11 or tube portions 1.3, 2.3.

The longitudinal supports 1, 2 are in turn connected by the steering gear housing 5 made of sheet steel. The steering gear housing 5 is thus part of the structural component of the front axle support. The main component of the steering gear housing 5, which replaces a conventional (additional) transverse support, is the steering rack housing 5.1, which consists of a manipulated sheet steel tube, i.e. one formed by bending and crimping. The housing geometry is kept very simple, in such a way that complex and therefore expensive production methods, such as internal high pressure forming, can be avoided.

The steering gear housing 5 is made substantially watertight. Track rods 18 are mounted at the ends of the steering rack 17 mounted in the steering rack housing 5.1, and are sealed off from the steering gear housing 5 by bellows 19. To provide a tight connection between the left bellows 19 and the steering gear housing 5, the end 5.11 of the steering rack housing 5.1 in that position may be machined subsequently on the inside.

On the left-hand side, the steering rack housing 5.1 is penetrated by two cylindrical housing portions 5.12, 5.13. These are a pinion housing 5.12 and a pressure piece housing 5.13 arranged offset therefrom by approximately 90°. A pressure piece, which can be screwed into the pressure piece housing 5.13, is adjusted and fixed in rotation so as to adjust the play of the steering rack 17 for optimum friction levels. The components 5.12, 5.13 are both tube portions which are machined after being welded to the steering rack housing 5.1. A sensor housing 20 is attached to the pinion housing 5.12. A torsion rod and a sensor shaft, which is connectable to the steering column of the vehicle, are arranged in the sensor housing 20.

Figure 5:
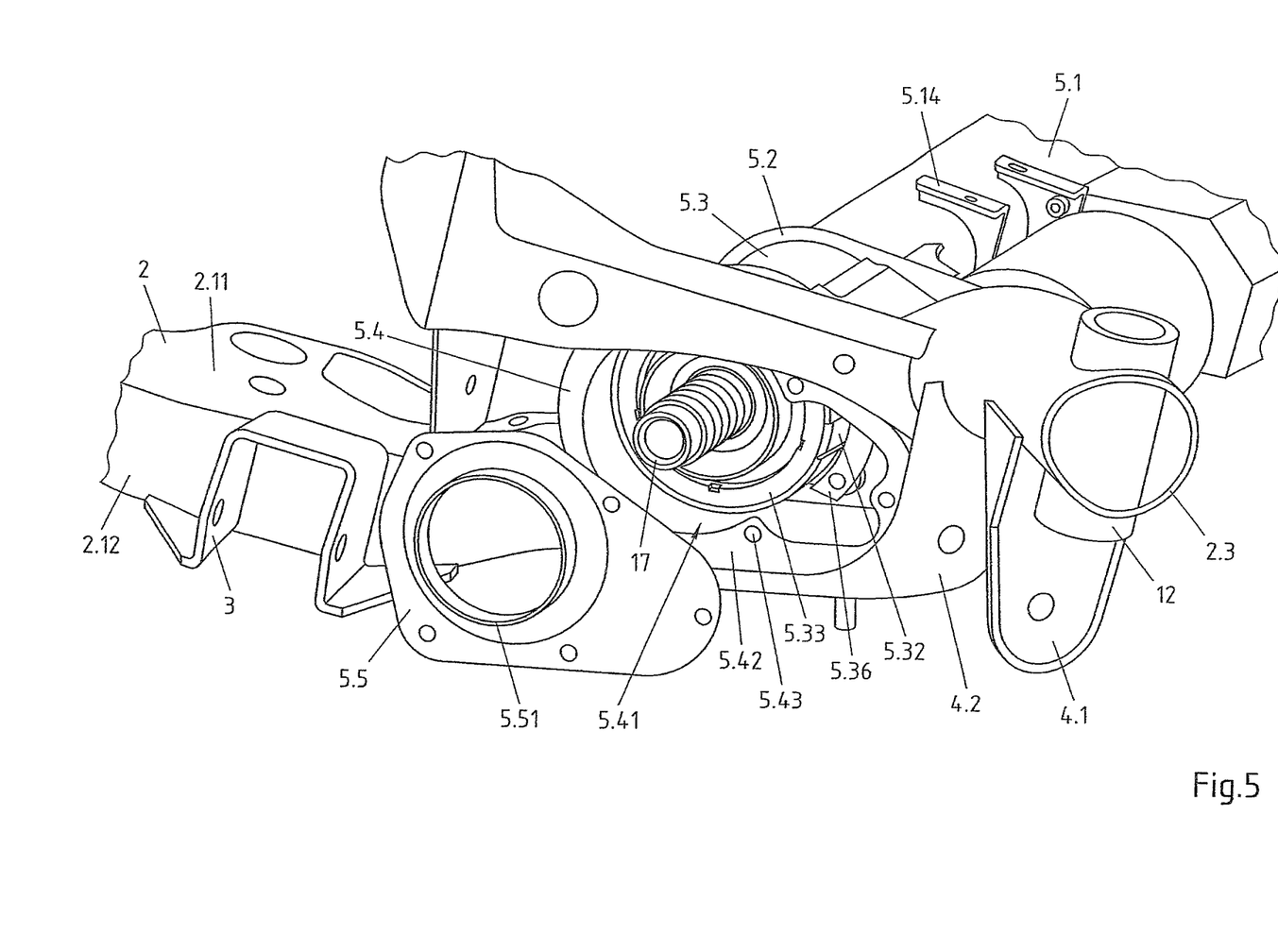

On the right-hand side, the steering rack housing 5.1 ends at a motor plate 5.2. This is an intermediate metal sheet made of steel, which acts as a connection to a bearing housing (main bearing housing) 5.3 which receives a ball screw and a support for a servo steering motor 21. For this purpose, the motor plate 5.2 comprises an aperture (not shown) inside the steering gear housing for the guiding through of the steering rack 17, an aperture 5.22 for receiving the motor shaft, and elongated holes 5.23 for screwing in the motor 21. The motor shaft extends parallel to the longitudinal axis of the tubular steering rack housing 5.1. The motor 21 drives the steering rack 17 via a belt drive and the ball screw. The elongated holes 5.23, of which the longitudinal axes extend substantially mutually in parallel, make it possible to tighten the belt drive by displacing and fixing the motor 21. In addition, the motor is braced in the central region of the steering gear housing 5 (steering rack housing 5.1) on a motor retainer 5.14 welded in this region (see FIG. 2). Two planar sheet metal supports 5.15 are welded to the steering rack housing 5.1 and the motor plate 5.2. The sheet metal supports 5.15 reduce the jump in rigidity between the motor plate 5.2 and the steering rack housing 5.1. The bearing housing 5.3 connected on the right-hand side is formed as an impact extruded part which is subsequently machined. For axially fixing the ball screw, the bearing housing 5.3 has an internal diameter which widens in steps or an offset. The bearing housing 5.3 also has an axially extending cutout 5.32 for receiving the belt drive. A threaded ring 5.33 is provided for axially fixing a cylindrical bearing shell of the ball screw, and can be screwed into the bearing housing (FIG. 5). On the inside thereof, the threaded ring 5.33 comprises recesses, which are arranged distributed over the circumference and on which a screwing tool can engage in a positive fit. Further, the bearing housing 5.3 is provided on the outside thereof with projecting holders (not shown), onto which a connecting bridge 5.36, which bridges the axial cutout 5.32, can be screwed. The mounted connecting bridge 5.36 stabilises the bearing housing 5.3 and prevents radial expansion thereof in the region of the cutout 5.32.

A housing 5.4 is connected to the main bearing housing 5.3, encloses the belt drive and is associated with the ball screw. The ball screw housing 5.4 is formed in two parts and is welded circumferentially, i.e. in a water-tight manner, to the main bearing housing 5.3 and the motor plate 5.2. The ball screw housing 5.4 comprises a flange 5.42, which defines a lateral mounting opening 5.41 and is provided with recesses 5.43 and nuts welded onto the inside thereof for fixing a cover lid 5.5 which seals the ball screw housing. The cover lid 5.5 has an opening comprising a collar-shaped formation 5.51 which acts as a seal seat for the right bellows.

The steel sheets used to produce the front axle support have standard qualities such as S355MC and S420MC. The sheet thicknesses are thus preferably in the range of 1.5 mm to 3.5 mm. The surface of the front axle support according to the invention is protected against corrosion by a lacquer coating.

An electronic control device 22 is flange-mounted to the servo steering motor 21. A sensor, which is arranged in the region of the input shaft 23 or steering column and connected to the control device 22 via a cable, detects the assisting torque required by the driver and reports this to the control device. The control device 22 comprises a programmable microprocessor, in which software is stored which analyses the signal emitted to the control device 22 by the sensor and checks it for plausibility, before the motor 21 is actuated. The motor 21 generates the required power (torque*rotational speed), which via the mechanical components, such as the belt drive and recirculating ball thread, transmits the required steering power assistance to the steering rack 17 and from there, via the track rods 18, ultimately to the positioning of the wheels.

The servo steering motor 21 is a brushless synchronous motor which comprises neodymium magnets. The power range of the motor 21 is preferably in the range of 3.5 Nm to well over 9 Nm. The motor is equipped with a star point relay so as to provide the required safety if a winding short-circuits.

A torque sensor is used to detect the desired driver assistance torque and measures in a contactless manner the magnetic flux difference resulting from the twisting of the torsion rod. The functional reliability of the steering is provided by doubling the sensors arranged in the sensor housing 20, i.e. by a redundancy of the sensors, and by software modules running in parallel which continuously check all sensor signals or functions for plausibility.

Figure 6:
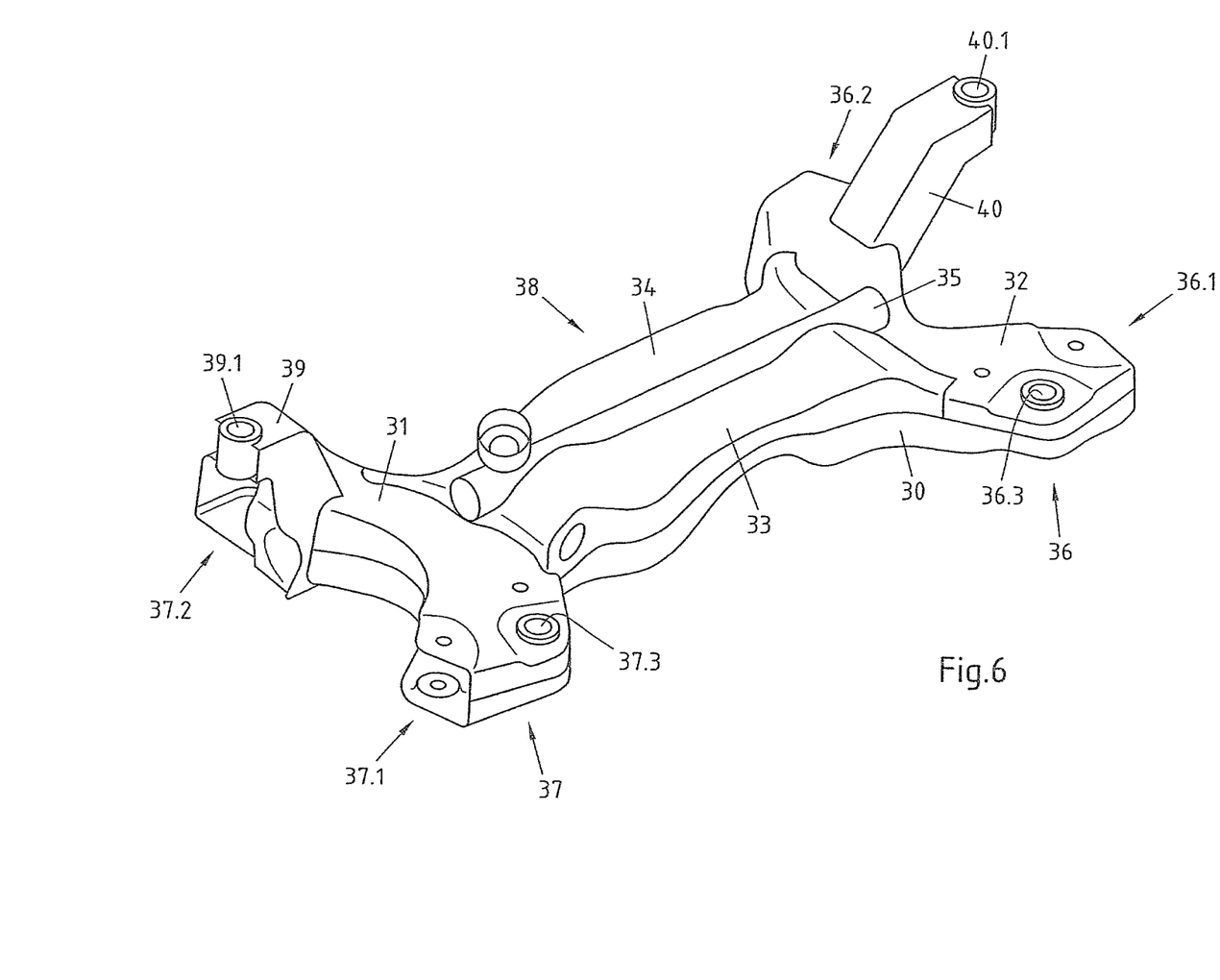
FIG. 6 is a perspective drawing of a second front axle support according to the invention.
Figure 7:
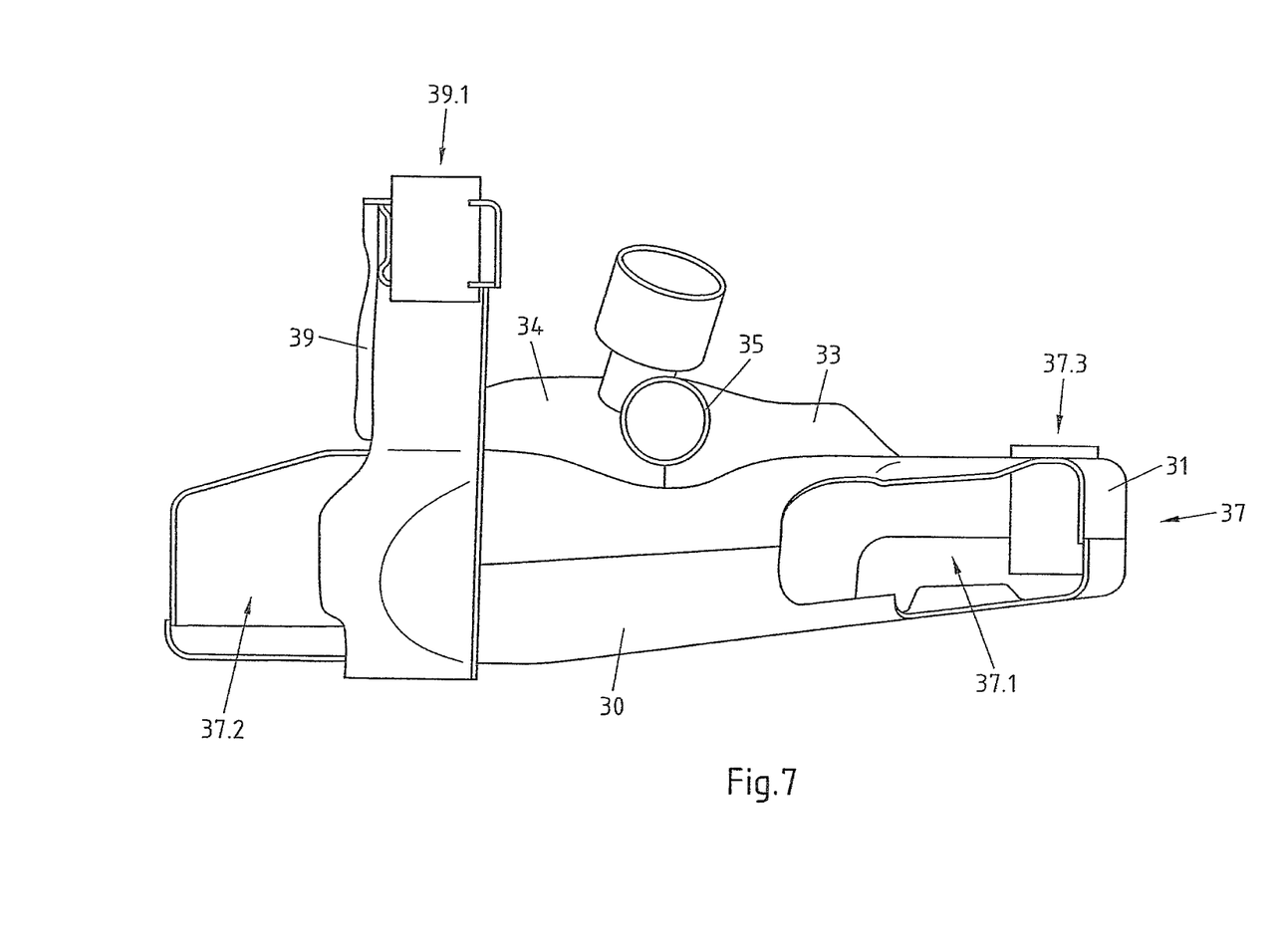
FIG. 7 is a cross-section of the front axle support of FIG. 6.

FIGS. 6 and 7 show the configuration of a second front axle support according to the invention having an integrated steering gear housing. The front axle support is composed of a plurality of sheet metal shells 30, 31, 32, 33, 34 which are welded together. The sheet metal shell 30 is produced from a sheet metal blank as a single-piece sheet metal half-shell, which forms the lower part of the front axle support. Further, two further sheet metal shells 31, 32 are provided, which are respectively connected by welds to the left-hand side and right-hand side of the sheet metal shell 30 forming the lower part of the front axle support and which together with the sheet metal shell 30 form support members 36, 37, which comprise the holders 37.1, 37.2, 36.1, 36.2 for mounting wheel guidance members. The front axle support has a transverse structure which is formed from a central portion 38 of the sheet steel shells 30, 33 and 34 which are welded together and from a steering gear housing made of steel. The sheet metal shells 30, 31, 32 which are welded together and arranged with mutual spacing make it possible to receive wheel guidance members, in such a way that no additional components, such as brackets, are required for this purpose, or components of this type for receiving wheel guidance members can be reduced to a minimum. Additional brackets 39, 40 may be provided, and are welded to the support members 36, 37. Via the openings 39.1, 40.1 and 37.3, 36.3 of the support members 37, 36, the front axle support can be connected or screwed to the vehicle body.

Receiving the steering gear housing 35 between the sheet metal shells 33, 34, these elements being welded together, makes a very flexurally rigid configuration of a front axle support possible. The construction height of the front axle support may accordingly be reduced, taking into account the requirements thereon.

Alternatively, the sheet metal shells 31, 32, 33 and 34 may be replaced by just one sheet metal shell. In particular, the present invention includes an embodiment in which the front axle support is formed from a single-piece upper shell and a single-piece lower shell having an integrated steering gear housing.

The embodiment shown in FIGS. 6 and 7 relates to a front axle support having an integrated steering gear in the form of a hydraulic steering gear. However, with appropriate adaptation, the steering gear integrated into a front axle support according to FIGS. 6 and 7 may also be an electromechanical steering gear, as is disclosed above in connection with the embodiment disclosed in FIG. 2 to 5.

The implementation of the front axle support according to the invention is not limited to the above-described embodiments. Rather, numerous variants are conceivable which also make use of the invention in a form deviating from the embodiments.

The invention claimed is:

1. A front axle support for a motor vehicle having support members, which comprise holders for mounting wheel guidance members, and a transverse structure, which forms a housing of a steering gear, the support members being connected to the transverse structure, wherein the support members are in the form of longitudinal supports, each longitudinal support being formed from sheet metal shells welded together, wherein the transverse structure is in the form of a transverse support and is formed from a tubular steering gear housing made of steel, and wherein the longitudinal supports are welded to the steering gear housing so that the transverse connection of the longitudinal supports is formed by the steering gear housing which forms the transverse support.

2. The front axle support according to claim 1, wherein a portion of each longitudinal support is formed from sheet metal shells welded together and a further portion thereof is formed from a curved tube portion.

3. The front axle support according to claim 1, wherein the steering gear housing is formed from a tubular steering rack housing, a bearing housing which receives a ball screw, and a ball screw housing which encloses a belt drive.

4. The front axle support according to claim 3, wherein the steering rack housing and the bearing housing are welded to a motor plate arranged between them for mounting a servo steering motor.

5. The front axle support according to claim 4, wherein the motor shaft of the servo steering motor mounted on the motor plate extends parallel to the longitudinal axis of the steering gear housing.

6. The front axle support according to claim 4, wherein the motor plate is connected to the steering gear housing via a sheet metal support.

7. The front axle support according to claim 3, wherein the ball screw housing comprises a flange, which defines a lateral mounting opening and is provided with recesses and nuts welded thereto for fixing a cover lid which seals the ball screw housing.

8. The front axle support according to claim 7, wherein the cover lid comprises an opening having a collar-shaped formation as a seal seat for a bellows.

9. The front axle support according to claim 3, wherein the bearing housing is formed with an internal diameter which widens in steps and with an axially extending cutout.

10. The front axle support according to claim 1, wherein each longitudinal support is provided with a mounting bush, which is inserted into a recess of the tube portion in a positive fit, at the end region of the curved tube portion.

11. The front axle support according to claim 1, wherein a first holder is welded to the respective tube portion of the longitudinal support and forms, together with a second holder, formed on one of the sheet metal shells of the longitudinal support, a bearing for a wheel guidance arm.

12. The front axle support according to claim 1, wherein a single-piece fork-shaped holder for mounting a wheel guidance member is welded onto the portion, formed from sheet metal shells, of the longitudinal support.

13. The front axle support according to claim 1, wherein a holder or a bracket for mounting the internal combustion engine of the motor vehicle is welded to at least one of the longitudinal supports.

14. The front axle support according to claim 13, wherein the holder or the bracket for mounting the internal combustion engine is welded to one of the sheet metal shells and/or to one of the curved tube portions.

15. The front axle support according to claim 1, wherein nuts are welded or threaded holes are formed on the portions, formed from sheet metal shells, of the longitudinal supports, with a reinforcing and/or shielding metal sheet being screwed to said nuts or threaded holes.

16. A front axle support for a motor vehicle having support members, which comprise holders for mounting wheel guidance members, and a transverse structure, which forms a housing of a steering gear, wherein the support members are connected to the transverse structure, wherein the respective support members are formed from sheet metal shells welded together, wherein the transverse structure is formed from a central portion of the sheet metal shells welded together and a steering gear housing made of steel, and wherein the steering gear housing is arranged between the sheet metal shells and is welded thereto.

* * * * *